Oct. 20, 1925.

O. BENSHADLE 1,557,966

GUIDE CLAMP FOR PLUMBERS' TESTING PLUGS

Filed Dec. 29, 1924

Inventor

O. Benshadle

By Clarence A. O'Brien

Attorney

Patented Oct. 20, 1925.

1,557,966

UNITED STATES PATENT OFFICE.

OTTO BENSHADLE, OF BUFFALO, NEW YORK.

GUIDE CLAMP FOR PLUMBERS' TESTING PLUGS.

Application filed December 29, 1924. Serial No. 758,780.

*To all whom it may concern:*

Be it known that I, OTTO BENSHADLE, a citizen of the United States, residing at Buffalo, in the county of Erie and State of New York, have invented certain new and useful Improvements in Guide Clamps for Plumbers' Testing Plugs, of which the following is a specification.

The present invention appertains to a guide clamp for use in the plumbing art, and aims to provide a device which will be effective and efficient in relieving the strain on testing plugs, in the ends of pipe sections. It is well known, by those skilled in the plumber's art, that when the plug becomes wet and full of clay, it is very slippery, and the plumber finds it necessary to draw the plug up so tight that it often breaks the rubber and becomes leaky. By the use of this guide clamp, all excessive strain is taken off of the plug, so that it is not necessary to draw the same up, so as to strain the rubber thereof excessively.

Another very important object of the invention is to provide a guide clamp of this nature, which may be very quickly and easily assembled and disassembled, in relation to the plug.

A still further very important object of the invention is to provide a guide clamp of this nature, having a very simple structure, which is thoroughly reliable, inexpensive to manufacture, easy to handle, strong, durable, not liable to readily get out of order, and well adapted to the purpose for which it is designed.

With the above and numerous other objects in view, as will appear as the description proceeds, the invention resides in certain novel features of construction, and in the combination and arrangement of parts as will be hereinafter more fully described and claimed.

Figure 1:
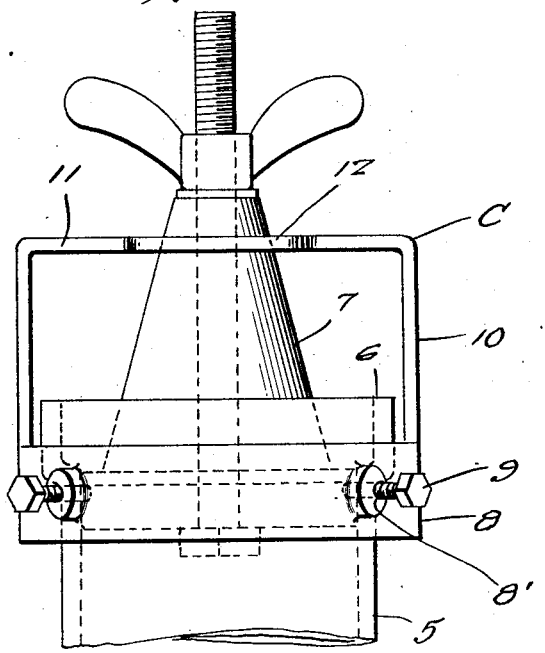
Figure 1 is an elevation of an assemblage, showing a pipe section with a plug held in place by my improved guide clamp.
Figure 2:
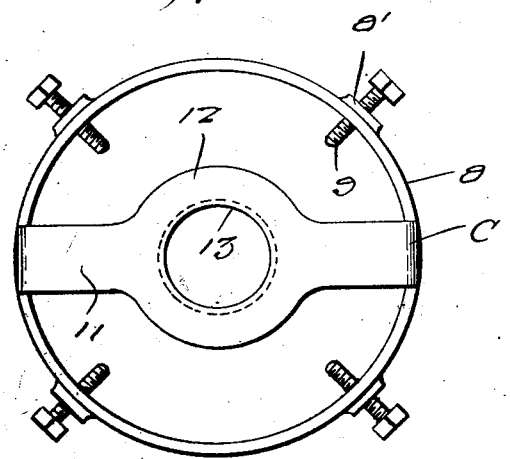
Figure 2 is an end elevation of the guide clamp.
Figure 3:
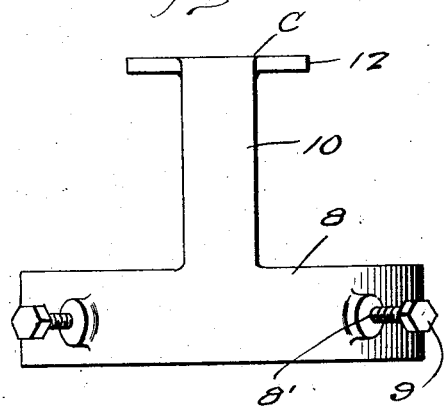
Figure 3 is a side elevation thereof.

Referring to the drawing in detail, it will be seen that 5 designates a pipe section of conventional construction, having the usual enlarged end 6, for the reception of another pipe section. The numeral 7, indicates the testing plug which is of conventional construction, and it needs no detailed explanation, except to note that it is of a conical formation. This plug, in Figure 1, is shown in circuit in the pipe section 5, and is sufficiently expanded as to prevent leakage between it and the interior of the pipe section 5.

My improved guide clamp is indicated generally by the letter C, and includes a ring 8, having a plurality of threaded reinforced openings 8, for receiving screws or bolts 9, so that the ring may be held adjacent the enlarged end 6 of the pipe section, the screws or bolts 9 engage the bead formed thereby. A yoke is extended from the ring 8, including the legs 10, formed integral with one edge of the ring and at their other ends formed integral with a cross bar or intermediate portion 11. At the center of this cross bar 11, an enlargement 12 is provided, preferably of circular construction, having an opening 13 therein, the edge of which is bevelled so as to fit the conical surface of the plug 7, when assembled, as shown in Figure 1.

When this guide clamp is in position on the pipe section, it will be seen that it will prevent movement of the plug outwardly through the open end 6, and thus it will not be necessary to expand the plug excessively, in order that it may remain in the end of the pipe section.

It will be apparent from the above, that this clamp will greatly lengthen the life of the plug, and increase its efficiency. There is nothing about the clamp which requires any great skill to operate, and it is not liable to readily get out of order, and furthermore may be placed on the market at a very low cost. It will also be apparent that the embodiment of the invention, which I have described in detail, includes all of the features of advantage enumerated as desirable, in the statement of the invention, and the above description, and it is thought that numerous changes in the details of construction, in the materials, and in the combination and arrangement of parts may be resorted to, without departing from the spirit or scope of the invention as hereinafter claimed, or sacrificing any of its advantages.

Having thus described my invention, what I claim as new is:

In combination, a ring having a plurality of reinforced threaded openings, screws in the openings for engagement with a pipe section, a U-shaped yoke having its ends fixed to the ring and its intermediate portion enlarged at its center and provided with an opening having a beveled edge, and a cone-shaped filling plug for association with the pipe section with which the screws are engaged and adapted to be received in the opening of the U-shaped yoke and rest against the beveled edge thereof.

In testimony whereof I affix my signature.

OTTO BENSHADLE.